March 5, 1940.　　　　C. M. EASON　　　　2,192,301
CLUTCH
Filed Jan. 21, 1937　　　2 Sheets-Sheet 2

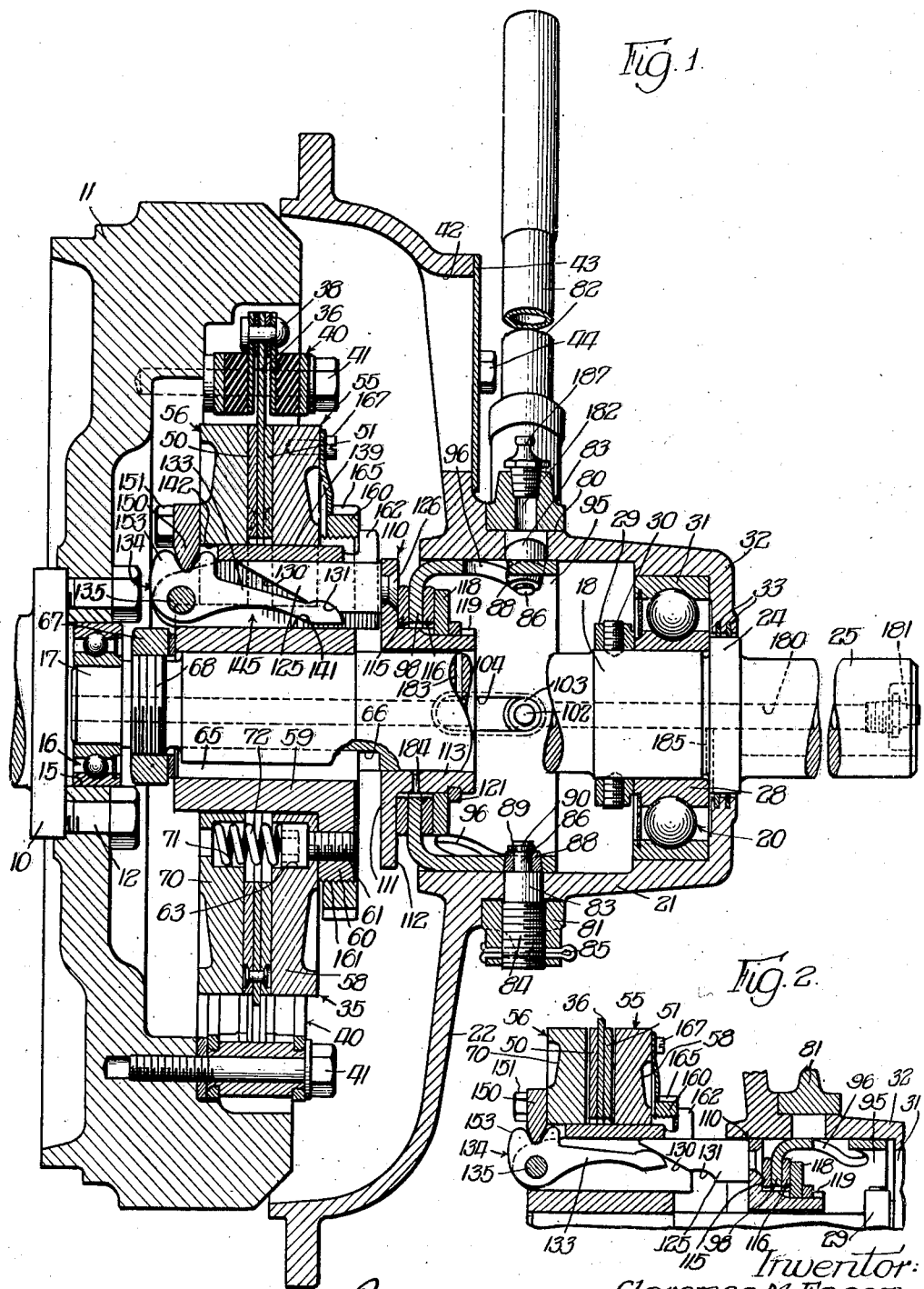

Inventor:
Clarence M. Eason,
By Brown, Jackson, Boettcher, Dienner
attys

Patented Mar. 5, 1940

2,192,301

UNITED STATES PATENT OFFICE 2,192,301

CLUTCH

Clarence M. Eason, Waukesha, Wis., assignor to Industrial Clutch Company, Waukesha, Wis., a corporation of Wisconsin Application January 21, 1937, Serial No. 121,628

20 Claims. (Cl. 192—68)

The present invention relates generally to improvements in clutches and is particularly concerned with industrial clutches especially adapted for use as power take-offs and the like.

The principal object of the present invention is the provision of a disc clutch of simple and sturdy construction in which the movable disc is forced against the companion clutch plate with a positive pressure and which is disposed on the inside of the other clutch members so that when the clutch unit is detached for the purpose of replacing or renewing the clutch linings, the removal of the shiftable clutch member and associated parts is appreciably facilitated. Another important object of the present invention in this connection is the provision of an inside mounting for the shiftable clutch member which is controlled by bell crank levers, a portion of each of which extends across the shiftable clutch member axially outwardly through the fixed clutch member.

Another important object of the present invention is the provision of a clutch in which two relatively movable clutch members are disposed on opposite sides of a driving clutch plate and in which the keys or other means for causing the two driven clutch members to rotate together carry the operating levers by which the inner shiftable clutch member is forced outwardly so as to clamp the driving clutch member between the driven clutch members.

An additional object of the present invention is the provision of clutch mechanism including a clutch housing having a nose, or extended section, on the interior of which is disposed an axially shiftable cam member that controls the clutch and which, in turn, is controlled by a transversely movable hand lever the operation of which causes the axial movement of the cam member, by virtue of the latter being constrained for axial movement only with respect to the clutch housing.

Another object of the present invention is the provision of new and improved clutch adjusting mechanism mounted on the outside of the driven clutch member that is fixed to the driven shaft, and which controls the position of the members that carry the operating levers for the inner shiftable clutch member.

These and other objects and advantages of the present invention will be apparent to those skilled in the art after a consideration of the following detailed description of the preferred structural embodiment, taken in connection with the accompanying drawings illustrating such embodiment.

In the drawings:

Figure 1 is a vertical longitudinal section taken through a clutch assembly embodying the principles of the present invention;

Figure 2 is a fragmentary section, similar to Figure 1 but on a somewhat smaller scale, illustrating the position of the parts when the clutch is disengaged;

Figure 3:
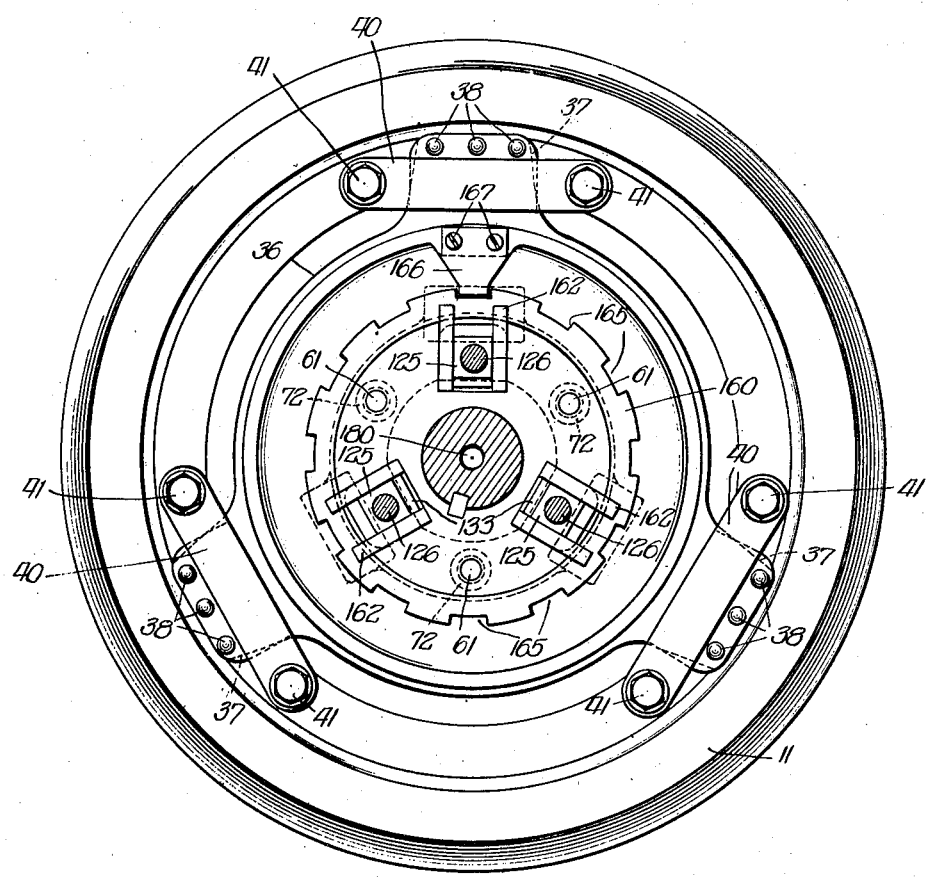
Figure 3 is a face view of the clutch shown in Figure 1.

Referring now to the drawings, more particularly to Figure 1, the clutch mechanism chosen to illustrate the principles of the present invention is in the nature of an industrial clutch unit adapted to derive power from any convenient source, such as an engine driven crank shaft 10 carrying the driving element in the form of a flywheel 11 suitably secured to the driving flange of the crank shaft 10 by stud bolts 12. A central opening 15 in the flywheel flange serves as a recess to receive ball bearing means 16 which pilots the inner reduced end 17 of a driven shaft 18. The outer end of the driven shaft 18 is journaled by means of a ball bearing unit 20 in the extended nose section 21 of a clutch housing 22. A flange 24 is formed on the driven shaft 18 between the portion thereof that receives the clutch mechanism and the outer end section 25 which receives a pulley or other part to be driven. The bearing unit 20 includes an inner race 28 held against the inside of the flange 24 by a collar 29 fastened, as by set screws 30, to the driven shaft 18, and an outer bearing race 31 disposed up against the flange 32 of the housing extension or nose section 21. A suitable lubricant sealing means 33 is disposed between the inturned flange 32 and the flange 24 on the driven shaft 18.

The clutch proper is indicated in its entirety in Figure 1 by the reference numeral 35 and includes a driving clutch plate member 36 which is provided with three radially outwardly extending lugs 37 (Figure 3), each of which is riveted, as at 38, to a flexible rubber connecting unit 40, the details of which do not form a part of the present invention. Each of the flexible rubber connecting units 40 is bolted by cap screws 41 to the flywheel 11 so as to be readily detachable therefrom, access being had to each of the units 40 through a hand opening 42 (Figure 1) that is closed by a removable plate 43, cap screws 44 being employed for fastening the plate 43 over the opening 42 in the clutch housing 22.

The driving clutch member 36 is provided with the usual friction lining 50—51 riveted or otherwise fixed to the plate 36, the driving clutch plate 36 being disposed in between a pair of driven clutch members in the form of plates or discs 55 and 56. The driven clutch member 55 includes a driven plate 58 and a hub member 59 that is provided with a flange 60 to which the driven plate member 58 is fastened in any suitable manner, as by socket bolts 61, the inner portion of the driven plate member 58 having a plurality of recesses 63 receiving the heads of the bolts 61. The hub 59 of the driven member 55 is fixed to the inner end of the driven shaft 18 so as to rotate therewith, a key 65 being inserted in a slot in the hub 59 and in a slot 66 in the driven shaft 18. The hub 59 is held in place on the driven shaft 18 by a nut 67 which is screwed onto a threaded portion 68 at the inner end of the driven shaft 18 and which forces the hub 59 up against a shoulder formed on the driven shaft adjacent the threaded end 68.

The other driven clutch member 56 is mounted about the hub 59 of the fixed driven clutch member 55 and is in the form of a clutch plate or disc 70, preferably identical with the disc member 58 for manufacturing convenience. Like the disc member 58, the member 70 is provided with recesses 71 arranged in registry with the recesses 63 so as to receive relatively light springs 72 which are seated in the recesses 63 and 71 and serve to separate the driven clutch sections 58 and 70. Preferably, there are three springs 72 spaced equal distances apart about the inner periphery of the driven clutch discs 58 and 70.

The driven clutch members 55 and 56 are arranged to be forced together with a positive action so as to clamp the driving clutch plate 36 therebetween by a cam and wedge arrangement that insures positive gripping action without the use of heavy coil springs or the like, and hence the clutch structure of the present invention is particularly adapted for heavy duty service. The nose extension or section 21 of the clutch housing 22 is provided with a shoulder 80 which is embraced by the hub 81 of a hand lever 82. At diametrically opposite points the hub 81 carries hardened steel studs 83, the outer ends 84 of which are threaded into the hub 81 and held in position therein by a cotter key 85 or any other suitable means. The inner end 86 of each of the studs 83 is reduced and rotatably receives a roller 88 which is held in place thereon by a spring ring 89 engaging in a groove 90 at the inner end of the reduced stud section 86. An axially shiftable cam member 95 is disposed within the nose 21 of the clutch housing 22 and is provided with two diametrically opposite angled cam slots 96 in which the rollers 88 are disposed. The cam member 95 is in the form of a sleeve or cup having an inturned flange 98 at its inner end, and the cam member 95 is constrained for axial movement only in the clutch housing 22 by means of a pair of diametrically opposed studs 102 carrying rollers 103 that operate in longitudinally extending slots 104 formed in the cam member 95. As is obvious, when the handle 82 is rocked in one direction, toward the observer in Figure 1, the action of the cam rollers 88 in the cam slots 96 reacts against the cam member 95 so as to cause the same to be shifted to the right within the nose 21, the member 95 being limited to an axial movement by virtue of the slots 104 and the stud rollers 103. When the handle 82 is rocked in the other direction, the cam member 95 is forced toward the left, this position being the one indicated in Figure 1.

A shift member 110 rotatable with the driven members 55 and 56 and the driven shaft 18, is arranged to be shifted axially by the axial movement of the cam member 95, and the member 110 takes the form of a sleeve or collar 111 having a flange 112 and a hub section 113. The latter receives a pair of anti-friction thrust rings 115 and 116 which are disposed on opposite sides of the inturned flange 98 on the cam member 95, and a plate 118, having a toothed connection with one or more splines 119 on the hub 113, is held in fixed position on the latter by means of a spring ring 121. By virtue of this construction, the shift member 110 rotates with the driven shaft 18 at all times, but is movable axially in accordance with the axial movement of the cam member 95.

A plurality, preferably three, of camming wedge members 125 are riveted, as at 126, to the flange 112 of the shift member 110 and thereby form a part of the latter and move axially therewith as the cam member 95 is shifted. Each of the wedge sections 125 is formed with an inclined surface 130 and a notch 131 that cooperate with the elongated axially extending arm section 133 of a bell crank lever 134. The lever 134 is pivoted on a pin 135 which is carried by the inner extended ends 137 (Figure 4) of a U-shaped key member indicated in its entirety by the reference numeral 139. These members 139 not only form supports for the three bell crank levers 134 but also serve as keys or studs for causing the driven clutch members 55 and 56 to rotate together with the driven shaft 18 at all times. To this end, the hub member 59 of the driven clutch member 55 is notched, as at 141 (Figures 1 and 4), to receive the rear ends of the several keys or supports 139, and the other driven clutch member 56 is notched, as at 142 (Figure 1), to receive the inner ends of the U-shaped lever-supporting keys 139. Since both of the driven clutch members 55 and 56 are thus provided with openings receiving the members 139, the driven clutch parts 55 and 56 are caused to rotate together at all times.

Figure 4:
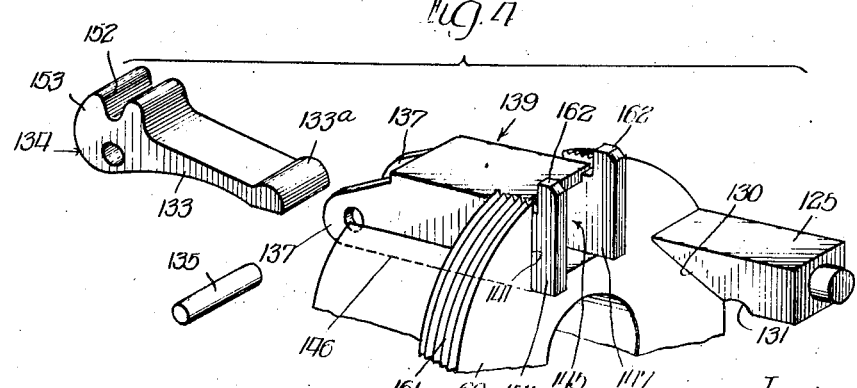
Figure 4 is a disassembled perspective view of certain of the parts of the mechanism for shifting the inner clutch member.

The form of the U-Ushaped keys 139 is best shown in Figure 4, and from this figure it will be seen that each of the key members provides, in effect, an axially extending recess 145 between the sides 146 and 147 of each of the members 139. In each of the axially extending recesses 145 is disposed the longitudinally and outwardly extending arm 133 of the associated bell crank 134 and the inwardly extending wedge section 125 of the shift member 110. The several wedge sections 125 are slidable between the sides 146 and 147 of the several keys 139 and in doing so swing the levers 134 about their pivot axes 135. The inner shiftable clutch member 156 carries a plurality of abutment plates 150, each of which is fastened to the inner edge of the driven clutch plate by a pair of cap screws 151 (Figure 1). The radially inner edge of each of the abutment plates 150 is tapered and is received within a notch 152 that is formed on the short arm 153 of the bell crank lever 134. Thus, whenever the several levers 134 are rocked about the supporting pivot pins 135, the driven clutch disc 70 is shifted inwardly or outwardly, according to which direction the levers 134 are moved or permitted to move. The axial position of the several supporting keys 139 is capable of being adjusted by means of a threaded ring 160 that is mounted on the periphery of the flange 60, which is also threaded, as indicated at 161 in Figure 4. Each of the keys 139 is provided with a pair of radially outwardly extending ears or shoulders 162 which are engaged by the threaded ring 160. The outer periphery of the latter is notched, as at 165, and a spring 166 is fastened, as by screws 167, to the clutch disc 58 and is biased to enter any one of the notches 165 so as to prevent accidental movement of the ring 160. As will be clear from Figure 1, whenever the threaded ring 160 is turned outwardly, or to the right as viewed in Figure 1, the ring 160 engages the shoulders 162 on the several keys 139 so as to shift the latter in the same direction. This adjustment serves to carry the lever supporting pins 135 also to the right and thereby serves to position the driven clutch disc 70 nearer the outside driven clutch disc 58 and will compensate for wear of the clutch linings 50 and 51. If the member 160 is turned in the other direction, the action of the springs 72 in tending to separate the driven clutch discs 58 and 70, will act through the abutment plates 151 and the levers 134 to shift the keys 139 in the other direction, always keeping the shoulders 162 in abutting engagement with the outside edge of the adjusting ring 160.

The operation of the clutch as a whole is believed to be apparent from the foregoing description. Figure 1 shows the clutch while it is engaged, and in this position the shift member 110 is disposed in its innermost position in which the wedges 125 have forced the bell cranks 134 to shift the driven clutch disc 70 and clamp the driving plate 36 firmly against the outside clutch disc 58 with a positive pressure which enables the transmission of relatively great amounts of power without relying upon relatively heavy springs and also without stressing any of the bearings with the force that is required to hold the driving clutch plate 36 between the driven members 55 and 56. In the engaged position of the clutch (Figure 1), the rounded outer end 133a (Figure 4) of the bell crank lever arm 133 drops into the notch 131 on the wedge 125 so as to eliminate any tendency for the clutch to become disengaged. The several lever arms 133 are purposely made slightly resilient, not only to permit the aforesaid movement of the rounded ends 133a into the notches 131, but also for the purpose of holding the clutch engaged with a certain amount of spring pressure and thereby providing a limited amount of yield in the clutch to take care of expansion and contraction of the clutch parts due to temperature changes. When it is desired to disengage the clutch, the handle 82 is turned so as to withdraw the wedges 125 axially outwardly of the lever supporting keys 139, the parts moving into the position shown in Figure 2, thereby permitting the springs 72 to expand and to separate the driven clutch parts 58 and 70 sufficient to release the driving clutch plate 36.

The lubrication of the above described clutch is a simple matter. The driven shaft 18 is provided with an axial bore 180 extending the length thereof and, at the pulley end 25 of the shaft 18, receives a lubricant supplying fitting 181. Lubricant forced into the shaft at this point moves inwardly to the inner end and lubricates the bearing 16. A transverse bore 183 leads from the axial bore 180 outwardly to lubricate the slidable shift member 110, and the hub 113 of the latter is provided with a bore 184 which conducts lubricant to the thrust rings 115 and 116. Another transverse bore 185 leads from the axial bore 180 outwardly to the bearing 20 to lubricate the latter. The hub of the hand lever 82 is lubricated by a second fitting 187 which directs lubricant through a short bore 182 under the shoulder 80 of the housing, whereby the hub 81 is lubricated as well as the studs 83 and rollers 88. This lubricant also lubricates the axially shiftable cam member 95.

When it is desired to remove the clutch unit, as for the purpose of renewing or replacing the clutch linings 50 and 51, the plate 43 is removed and then the bolts 41 for the resilient units 40 are removed. When the driving clutch plate 36 is thus disconnected from the flywheel 11, the clutch housing 22 may be detached from the engine and the entire clutch assembly lifted out of the flywheel and placed in upright position, making it very convenient to service the same. With the clutch unit in this position, preferably with the handle 82 turned so as to disengage the clutch, as illustrated in Figure 2, the abutment plates 150 are removed by detaching the bolts 151, and then the shiftable clutch plate 56 may be lifted out, followed by the removal of the driving clutch plate 36 and attached cushioned connections 40. In this operation the springs 72 are permitted to expand, and since these springs are relatively light, not being called upon to exert sufficient force to transmit the driving torque, the release of these springs is no objection. When the driving clutch plate 36 has been relined or replaced, the same is moved into position, followed by the insertion of the driven clutch disc 70. Then, by holding the latter down against the action of the springs 72, the abutment plates 150 can be reinserted into the notches 152 on the bell crank levers 134 and the bolts 151 tightened. After this has been done, the clutch unit is inserted into the flywheel and the housing 22 fastened in place. Next, the several cushioning units 40 are bolted to the flywheel and then the cover plate 43 attached, after which the clutch is again ready for operation.

Mention was made above of the fact that the springs 72 can be made relatively light, thereby facilitating servicing of the clutch. The action of the springs 72 in releasing the driving clutch plate 36 by separating the driven members 58 and 70 is augmented by the action of centrifugal force against the longitudinally extending arms 133 of the several bell crank levers, since when the driven shaft 18 rotates the several bell crank levers tend to swing in a direction to carry the shiftable clutch member 56 inwardly away from the driving plate 36.

While I have shown and described above the preferred structure chosen to illustrate the principles of the present invention, it is to be understood that the present invention is not to be limited to the specific details shown and described above, but that, in fact, widely different means may be employed in the broader aspects of my invention.

What I claim, therefore, and desire to secure by Letters Patent is:

1. A disc clutch comprising a driving clutch plate, a pair of relatively movable clutch members disposed on opposite sides of said plate, a plurality of levers pivoted on one of said members and connected to shift the other member, wedge means movable axially thereof for swinging said levers to operate the clutch, and means constraining the wedge means to rotate with said one member.

2. A clutch comprising a clutch plate, a pair of relatively movable clutch members on opposite sides of said clutch plate, a plurality of levers pivoted on one of said members and connected to shift the other member towards said one member to clamp said clutch plate therebetween, and wedge means movable axially of said one member for swinging said levers to operate the clutch, there being openings in said one member for receiving said wedge means and constraining the latter to rotate therewith.

3. A disc clutch comprising a driving clutch plate, a pair of clutch members disposed on opposite sides of said plate, a driven shaft, means fixing one of said clutch members to rotate with said driven shaft, axially inwardly directed supporting means carried by said fixed clutch member, the other clutch member being mounted on the inwardly extending portions of said supporting means and capable of axial movement thereon, and a plurality of bell-crank levers pivotally connected with said supporting means for shifting said axially movable clutch member toward and away from said fixed clutch member.

4. A disc clutch comprising a driving clutch plate, a pair of clutch members disposed on opposite sides of said plate, a driven shaft, means fixing one of said clutch members to rotate with said driven shaft, axially inwardly directed supporting means carried by said fixed clutch member, the other clutch member being mounted on the inwardly extending portions of said supporting means and capable of axial movement thereon, means carried on the inner ends of said supporting means and engageable with said shiftable clutch member for moving the latter relative to said fixed clutch member, and shift mechanism disposed axially outwardly of said pair of clutch members and operatively connected with said last named means for controlling the position of said shiftable clutch member.

5. In a clutch, a driven shaft, a pair of driven clutch members mounted thereon, means fixing one of said clutch members to said shaft, a shouldered member having a part extended through said fixed clutch member, means on the end of said part and engageable with the other of said driven clutch members for shifting said other member relative to the fixed member, and means carried on the latter and engageable with the shouldere on said shouldered member for adjusting the position of said shiftable clutch member.

6. A clutch comprising a driving plate, a driven shaft, a pair of driven plates mounted on said shaft, means fixing one of said driven plates for rotation with said shaft, a plurality of axially extending keys serving to cause said driven clutch members to rotate together, and means including a plurality of levers pivotally mounted on said keys for controlling the axial position of the other driven clutch member relative to said fixed clutch member and arranged when moved in one direction for clamping said driving clutch plate between said driven clutch members.

7. A clutch comprising a driving clutch plate, a driven shaft, a pair of driven clutch members carried on said shaft, means fixing one of said clutch members to said shaft and the other clutch member being mounted for axial movement toward said fixed clutch member so as to clamp the driving clutch plate therebetween, said axially movable clutch member being mounted on the inside of said fixed clutch member, a plurality of parts extending inwardly from said fixed clutch member to said shiftable clutch member, bell-crank levers pivoted on the inner ends of said parts and having one arm in operative engagement with said axially movable clutch member for moving the latter axially, means connected with said fixed clutch member for adjusting said lever carrying parts, and means movable axially within the latter and operatively connected with the other arm of each of said bell-cranks for moving said shiftable clutch member relative to said fixed clutch member.

8. A disc clutch comprising a driving clutch plate, a pair of driven clutch members disposed on opposite sides thereof, a driven shaft to which one of said driven clutch members is fixed, a plurality of axially extending parts slidably connected with said driven clutch member, means carried at one end of each of said parts and operatively connected with the other of said driven clutch members for shifting said other member relative to said fixed member, and means threadedly connected with said fixed clutch member and engaging the other end of each of said parts for adjusting the position thereof.

9. In a disc clutch, a driving clutch plate, a driven shaft, a pair of driven clutch members mounted on said shaft, the outer member being fixed to said shaft and the inner clutch member being mounted for movement toward and away from said driving clutch plate, means serving as keys extending axially from one of said driven members to the other and serving to cause said members to rotate together with said driven shaft, each of said key means having an axially extending opening therethrough, spring means acting normally to separate said driven clutch members, and means extending through said openings and operatively connected with said inner clutch member for clamping the driving clutch plate between said driven clutch members.

10. In a disc clutch, a driving clutch plate, a driven shaft, a pair of driven clutch members mounted on said shaft, the outer member being fixed to said shaft and the inner clutch member being mounted for movement toward and away from said driving clutch plate, means serving as keys extending axially from one of said driven members to the other and serving to cause said members to rotate together with said driven shaft, each of said key means having an axially extending opening therethrough, a bell-crank lever pivoted to the inner end of each of said key means and having one arm operatively connected to shift said inner driven clutch member and the other arm extending axially outwardly in the opening in said key means, and a shifting member having wedge sections extending into said key openings and operatively connected with said axially outwardly extending bell-crank arms for shifting said inner driven clutch member.

11. In a disc clutch, a pair of clutch members, one movable axially relative to the other and both having a plurality of registering openings formed therein, generally U-shaped keys disposed in said openings for causing said clutch members to rotate together, the sides of each of said U-shaped keys carrying a pivot at one end, and an operating lever connected with the shiftable clutch member mounted on each of said pivots and including a portion extending longitudinally of the U-shaped key between the sides thereof.

12. In a disc clutch, a pair of clutch members, one movable axially relative to the other and both having a plurality of registering openings formed therein, generally U-shaped keys disposed in said openings for causing said clutch members to rotate together, the sides of each of said U-shaped keys carrying a pivot at one end, a bell-crank lever mounted on each of said pivots and having one arm operatively connected with the shiftable clutch member and the other arm extending longitudinally of the associated key, and a shift member provided with wedging cam sections movable axially of said U-shaped keys and engaging the longitudinally extending arm of each of the associated bell cranks for swinging the latter to shift said shiftable clutch member.

13. In a disc clutch, a driving clutch plate, a driven shaft, a pair of driven clutch members mounted on said shaft, the outer member being fixed to said shaft and the inner clutch member being mounted for movement toward and away from said driving clutch plate, spring means acting normally to separate said driven clutch members, means serving as keys extending axially from one of said driven members to the other and serving to cause said members to rotate together with said driven shaft, each of said key means having an axially extending opening therethrough, a bell-crank lever pivoted to the inner end of each of key means and having one arm operatively connected to shift said inner driven clutch member and the other arm extending axially outwardly in the opening in said key means, and a shifting member having wedge sections extending into said key openings and operatively connected with said axially outwardly extending bell-crank arms for shifting said inner driven clutch member toward the outer driven clutch member to clamp said driving clutch plate therebetween.

14. In a disc clutch, a pair of clutch members, one movable axially relative to the other and both having a plurality of registering openings formed therein, means serving as keys disposed in said openings for causing said clutch members to rotate together, each of said key means carrying a pivot at one end, a lever connected with the shiftable clutch member mounted on each of said pivots and including a portion extending longitudinally of the registering openings in said clutch members, and an operating member having wedge parts extending into said openings and engaging said portions for swinging said levers.

15. In a disc clutch, a driving clutch plate, a driven shaft, a pair of driven clutch members mounted on said shaft, the outer member being fixed to said shaft and the inner clutch member being mounted for movement toward and away from said driving clutch plate, a part pivotally carried on the outer member and connected with the movable member whereby pivotal movement of said part in one direction shifts the inner clutch member away from the outer clutch member and pivotal movement of said part in the other direction forces the inner clutch member toward the outer clutch member, said part having a portion acted on by centrifugal force to swing said part in said one direction and shift the inner clutch member away from the outer clutch member, and means engageable with said part for swinging the latter in said other direction to force the inner clutch member toward the outer clutch member and engage the clutch.

16. In a disc clutch, a driving clutch plate, a driven shaft, a pair of driven clutch members mounted on said shaft, the outer member being fixed to said shaft and the inner clutch member being mounted for movement toward and away from said driving clutch plate, spring means acting normally to separate said driven clutch members, a part pivotally carried on the outer member and having a portion acted on by centrifugal force cooperating with said spring means for shifting the inner clutch member away from the outer clutch member, and means acting against the same portion subject to centrifugal force for shifting the inner clutch member toward the outer clutch member to engage the clutch.

17. In a disc clutch, a driving clutch plate, a driven shaft, a pair of driven clutch members mounted on said shaft, the outer member being fixed to said shaft and the inner clutch member being mounted for movement toward and away from said driving clutch plate, a part pivotally carried in an adjustable relation to the outer clutch member and having a portion acted on by centrifugal force to shift the inner clutch member away from the outer clutch member, and means having a positive connection with said portion for overcoming said centrifugal force and moving the inner clutch member toward the outer clutch member to engage the clutch.

18. In a disc clutch, a driving clutch plate, a driven shaft, a pair of driven clutch members mounted on said shaft, the outer member being fixed to said shaft and the inner clutch member being mounted for movement toward and away from said driving clutch plate, a plurality of levers connected with the inner clutch member for shifting the same relative to the outer clutch member, axially shiftable means carried by said outer member for pivotally supporting said levers, and means also carried by said outer clutch member and movable relative thereto and relative to said axially shiftable means for adjusting the position of the latter and the levers carried thereby relative to said outer clutch member.

19. In a disc clutch, a driving clutch plate, a driven shaft, a pair of driven clutch members mounted on said shaft, the outer member being fixed to said shaft and the inner clutch member being mounted for movement toward and away from said driving clutch plate, a part adjustably carried by said outer clutch member, a lever pivotally mounted on said adjustable part and having a portion acted on by centrifugal force to shift the inner clutch member away from the outer clutch member, and means connected with said lever for overcoming said centrifugal force and moving the inner clutch member toward the outer clutch member to engage the clutch.

20. In a disc clutch, a driving clutch plate, a driven shaft, a pair of driven clutch members mounted on said shaft, one member being fixed to said shaft and the other clutch member being mounted for movement toward and away from said driving clutch plate, spring means acting normally to separate said driven clutch members, a part pivotally carried on one member and having a portion acted on by centrifugal force cooperating with said spring means for snifting the movable clutch member away from the fixed clutch member, and means acting against the same portion subject to centrifugal force for shifting the movable clutch member toward the fixed clutch member to engage the clutch.

CLARENCE M. EASON.